United States Patent [19]

Abraham et al.

[11] 4,208,708

[45] Jun. 17, 1980

[54] CURRENT LIMITING ARRANGEMENT FOR DC ELECTRICAL APPARATUS

[75] Inventors: Jean-Jacques Abraham, Herblay; Denis Pinson, Les Clayes ss Bois, both of France

[73] Assignee: Compagnie Internationale pour l'Informatique CII HONEYWELL BULL, Paris, France

[21] Appl. No.: 889,515

[22] Filed: Mar. 23, 1978

[30] Foreign Application Priority Data

Mar. 25, 1977 [FR] France .................................. 77 09052

[51] Int. Cl.² ............................................ H02M 1/18
[52] U.S. Cl. ....................................... 363/57; 363/86; 361/58
[58] Field of Search ....................... 361/58; 363/49, 34, 363/37, 52–58, 79, 81, 84–86, 88, 96

[56] References Cited

U.S. PATENT DOCUMENTS

| | | | |
|---|---|---|---|
| 3,473,039 | 10/1969 | Fegley | 363/49 X |
| 3,678,368 | 7/1972 | Popp | 363/55 X |
| 3,816,810 | 6/1974 | Friedman et al. | 363/53 X |
| 3,821,630 | 6/1974 | Kornrumpf et al. | 363/57 |
| 3,868,562 | 2/1975 | Marshall | 363/86 X |
| 3,935,511 | 1/1976 | Boulanger et al. | 361/58 |

*Primary Examiner*—William M. Shoop
*Attorney, Agent, or Firm*—Lowe, King, Price and Becker

[57] ABSTRACT

The current supplied by an AC power source to a DC load is controlled so that full current is supplied to the load during steady state operation and partial current is supplied during transient conditions. A selectively energized series switch, including first and second parallel branches, is connected between the power source and the load. An impedance in series with one of the switches causes the partial current to be supplied by the power source to the load. The other parallel branch includes no such impedance and therefore feeds full current to the load. A voltage threshold detection circuit, having hysteresis characteristics, responds to the amplitude of the AC source to activate the switches so that no current can be passed through the switches in response to the source amplitude being less than the threshold level. The switches are actuated so that the partial current is supplied by the source to the load in response to the source amplitude being greater than the threshold for an interval equal approximately to the duration of the transient conditions. The switches are activated so that full current is supplied by the source to the load in response to the source amplitude being greater than the threshold level for an interval at least equal to the interval required to reach steady state operation. Monostable multivibrators respond to the voltage threshold detection circuit to enable currents from the source to be supplied to the load for between one and two cycles of the AC source after the source amplitude drops below the threshold level and to prevent the switches from closing until approximately one half cycle of the AC source has elapsed since the source amplitude has risen above the threshold level.

13 Claims, 6 Drawing Figures

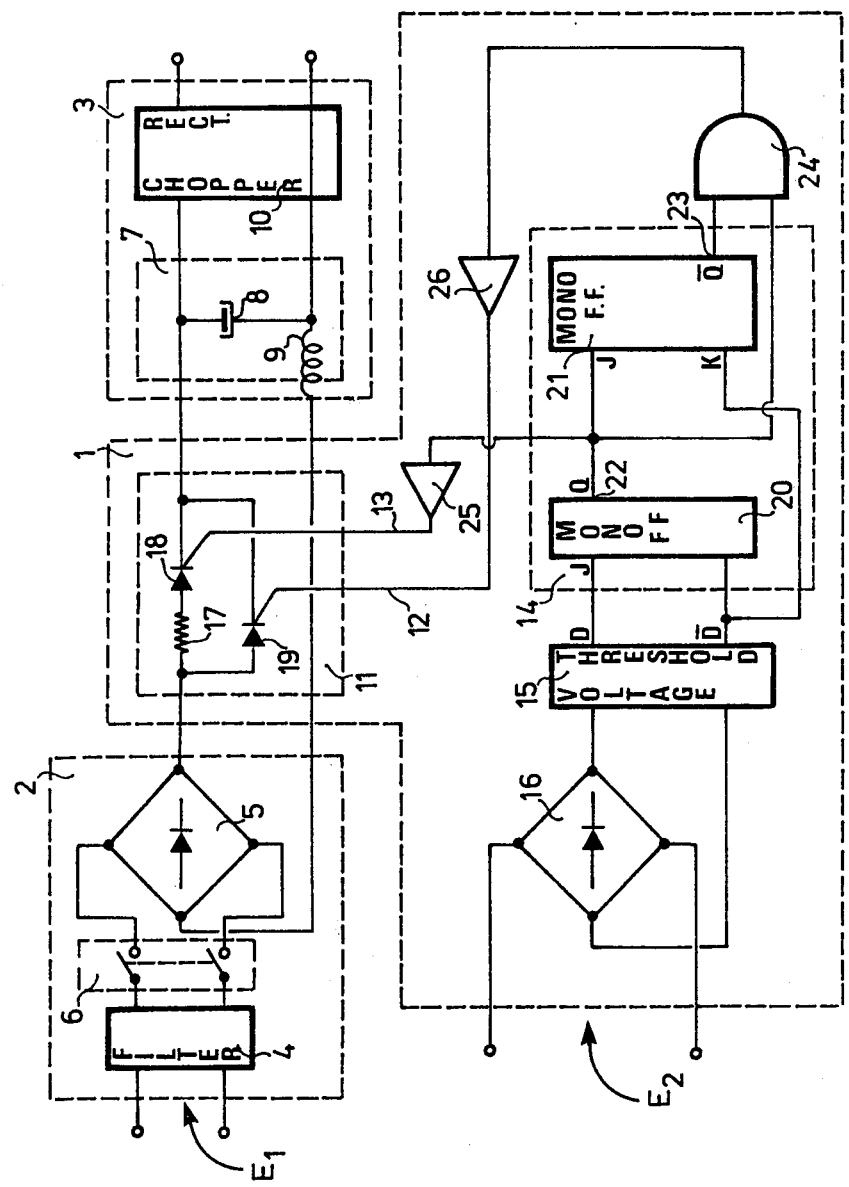

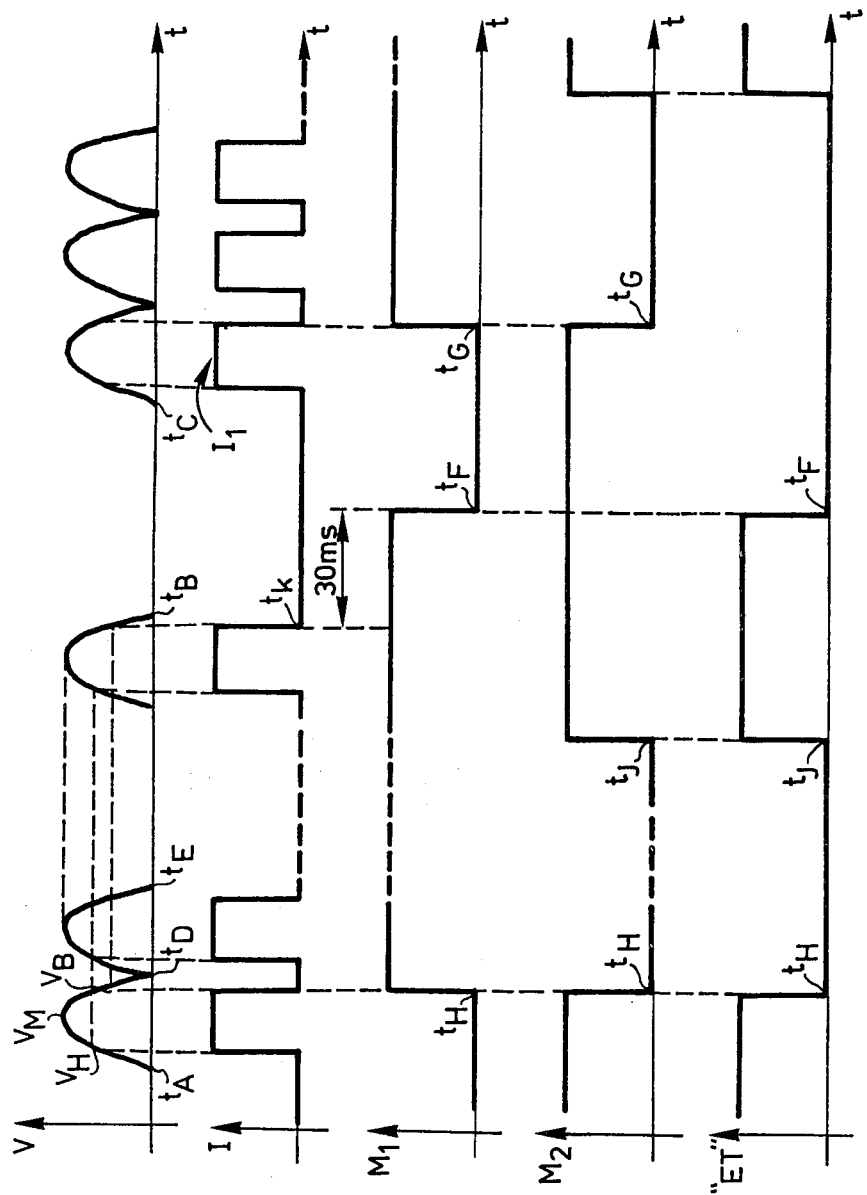

CURRENT LIMITING ARRANGEMENT FOR DC ELECTRICAL APPARATUS

FIELD OF THE INVENTION

The present invention relates to a current limiting arrangement for DC electrical apparatus. The invention is particularly intended to limit excess currents in a DC power supply formed by a DC to DC converter which is fed by an AC to DC converter. The invention is also applicable to any current rectifier in which excess currents may arise when the rectifier is switched on.

BACKGROUND OF THE INVENTION

When there has been a break in an AC power source which energizes a DC power supply, and the AC power source is subsequently restored, there may be a very high current drawn by a DC to DC converter in the DC power supply, particularly if a low impedance load is connected to the converter. Drawing excessive current may result in the destruction of certain components of the DC to DC converter, in particular in the destruction of an input filtering capacitor of the converter. It is therefore important for the drawn current to be controlled so that the DC power supply does not cause too high or too sudden a current drain when it comes on again following either a failure or a transient break in the AC power source.

There are various prior art devices to enable current to be limited in DC apparatus and in particular, in a DC power supply responsive to an AC power source, viz:

1. Arrangements which rely on thermoresistive components, particularly negative temperature coefficient thermistors. In the case of a DC electrical power supply for example, the thermistor is connected to the output of an AC to DC converter in series with the DC to DC converter. The thermistor has a high resistivity at ambient temperature. Following a break in the AC source, there is no current flowing in the thermistor so its resistance increases. When the AC power source is restored, the current drawn by the AC to DC converter is limited by the high resistance value of the thermistor. The thermistor temperature then increases due to the flow of current through it, so its resistance decreases, enabling the current supplied to a load to gradually rise as heat progresses; the resistance continues to decrease until steady state temperature and resistance of the thermistor are reached.

Arrangements which employ thermistors have the disadvantage of heating up as a function of the current supplied by the DC apparatus. Following a break, the resistance of the thermistor may be so low that the component does not sufficiently limit the drawn current. The extent to which the current is limited thus varies as a function of the length of the break.

2. Arrangements formed by a fixed resistor connected in parallel with a relay. These arrangements operate as follows: If there is a break in the AC supply, the relay opens and the current drawn by the power supply is limited by the value of the resistor as soon as the AC supply is restored. By employing suitable control means, the relay is held open until the current supplied by the power supply has reached its steady state value. Once the steady state value has been reached, the relay is closed to short circuit the resistor, whereby the power supply then operates under the normal planned operating conditions. Arrangements which employ a resistor short-circuited by a relay are not very reliable and have a rather long response time.

3. Arrangements formed by a thyristor having a gate electrode driven by an actuating circuit. The actuating circuit causes the thyristor to be fully conductive when the AC supply is on, but gradually increases the conductive properties of the thyristor by altering its firing angle, when the AC source is restored following a break. In this way, the current drawn by the DC power supply is limited and steady state conditions are only arrived at gradually. Circuits having a single thyristor are difficult to operate gradually.

BRIEF DESCRIPTION OF THE INVENTION

An object of the present invention is to provide a circuit for limiting current in a DC electrical apparatus, which circuit overcomes these drawbacks by preventing a current build up under erratic conditions following a break in the AC supply.

Another object of the invention is to provide a reliable current limiting AC to DC power inverter that is easily controlled and has a short response time.

In accordance with the invention, an improved current limiter is provided in a DC power supply responsive to an AC source. The current limiter is connected between the AC energy source feeding the apparatus and rectifying and/or filtering circuits contained in the DC power supply. The limiter includes a switching circuit having control inputs connected to timing means driven by a threshold detector for the amplitude of the AC source. The timing means and threshold detector are arranged so as to operate the switching circuit to limit any excess current in a DC electrical apparatus at the time when the AC source is restored after a break. The arrangement is reliable and has a short response time.

In an advantageous embodiment of the invention, the switching circuit has two parallel branches. The first branch contains a current limiting resistor connected in series with a thyristor, while the second branch is formed by a second thyristor, which is virtually the only impedance for current supplied to a load of the DC supply. Control gates or electrodes of the thyristors form control inputs of the switching circuit.

In a particular embodiment of the invention, the threshold detector for the amplitude of the AC source is of the trigger type, and has voltage hysteresis characteristics. The timing means associated with the threshold detector is formed by two monostable flip-flops respectively having outputs which control the first and second thyristors. The periods during which these flip-flops conduct are selected in such a way that any short duration transient break in the AC supply does not trigger the thyristors.

The above and still further objects, features and advantages of the present invention will become apparent upon consideration of the following detailed description and one specific embodiment thereof, especially when taken in conjunction with the accompanying drawing.

BRIEF DESCRIPTION OF THE DRAWING

FIG. 1 is a diagram of an arrangement according to the invention for limiting excess current, when applied to a DC power supply; and FIGS. 2a–2e show diagrams illustrating how an arrangement according to the invention operates.

BRIEF DESCRIPTION OF THE INVENTION

Referring to FIG. 1, there is shown a current limiter 1 for a DC electrical power supply. This power supply includes an AC to DC converter 2 which receives energy at its input E from an AC source as derived, e.g., from a 50 Hz, 220 volt source. The DC power supply also includes a so-called "chopping" DC to DC converter 3, which is connected to the output of the AC to DC converter 2 via limiter 1.

AC to DC converter 2 includes an input low pass filter 4 of known configuration which has a low impedance to the frequency of source E but a relatively high impedance to harmonics of the source; filter 4 drives full-wave rectifying bridge 5, selectively connected to the filter via the single pole, single throw contacts of switch 6.

DC to DC converter 3 contains an input smoothing filter 7, formed by shunt capacitor 8 and series inductor 9. Filter 7 is connected to a chopper-rectifier 10 that inverts the DC output voltage of the filter into an AC voltage that is appropriately changed in amplitude and then converted back to DC. Chopper-rectifier 10 is known per se and is not shown in detail.

Current limiter 1 contains a switching circuit 11 having control input leads 12 and 13 responsive to timing means 14 that is driven by voltage threshold detector 15 for the amplitude of the voltage, $E_2$, of the AC power source. In the illustrated embodiment, full-wave rectifying circuit 16 is connected between the AC power source voltage $E_2$ and detector 15 so that the detector is supplied with a DC input proportional to the amplitude of the voltage of the AC power source.

Switching circuit 11 has two parallel branches. One of these branches contains a resistor 17 connected in series with a first thyristor 18, while the other branch is formed by a second thyristor 19. Gate electrodes of thyristors 18 and 19 are connected to be fired by control signals on leads 12 and 13.

Threshold detector 15 for the AC power source is formed by a bistable detector of the Schmitt trigger kind that includes voltage hysteresis characteristics. Thus, detector 15 has a binary zero state in response to its input being less than a predetermined voltage amplitude, $E_D$. In response to the input to detector 15 exceeding $E_D$, detector 15 is driven to the binary one state, a state that is maintained until the detector input drops below $E_D-\Delta E$. In response to the input to detector 15 dropping below $E_D-\Delta E$, the detector returns to a binary zero state. Detector 15 includes a pair of output terminals on which are derived complementary binary D and $\overline{D}$ signals respectively indicative of the binary state of the detector, whereby signals D and $\overline{D}$ respectively have binary zero and one values in response to the detector being in the binary zero state, and vice versa for the detector being in the binary one state.

Timing means 14 includes two monostable J-K flip-flops 20 and 21. Complementary J and K inputs of the first monostable flip-flop 20 are respectively connected to be responsive to the trailing edges of complementary D and $\overline{D}$ outputs of bistable detector 15. The direct (Q) output 22 of flip-flop 20 is supplied to control lead 13 and the gate electrode of the first thyristor 18 via amplifier 25. Complementary inputs J and K of monostable flip-flop 21 are respectively connected to the trailing edges of output (Q) 22 of the first flip-flop 20 and to the $\overline{D}$ output of the bistable detector 15. Complementary output ($\overline{Q}$) 23 of monostable flip-flop 21 and the direct output Q of flip-flop 20 are combined in AND gate 24 that drives lead 12 and the gate of thyristor 18 through amplifier 25.

The conducting period of the first flip-flop 20 is between one and two cycles of the 50 Hz AC power source, while the conducting period of the second flip-flop 21 is at least equal to the build-up time of the current in the input filter 7 of converter 3.

The way in which the circuit operates is better understood by referring to FIG. 2. The diagram in FIG. 2a shows, as a function of time t, the rectified voltage V at the output of the full-wave rectifying bridge 5. In the diagram it is assumed that the AC power source comes on at time $t_A$, continues for many cycles (only three of which are shown), then suffers a break at time $t_B$, and is thereafter restored again at time $t_C$. The frequency of the AC power source is assumed to be 50 Hz, whereby the time which elapses during one half-cycle of the AC source from $t_A$ to $t_D$ is 10 milliseconds; the time which elapses during one complete cycle of the AC power source between $t_A$ and $t_E$ is 20 milliseconds.

The diagram in FIG. 2b represents the signal derived at the D output of bistable detector 15. Detector 15 goes into a first, binary one state when the value of the rectified voltage to which it responds is $V_H$, and then changes over to a second, binary zero state when the rectified voltage, having passed a value $V_M$, reaches another threshold $V_B$, which is less than $V_H$. Detector 15 continues to change states in this way as long as the rectified AC source voltage is present, i.e., until the time $t_B$ when the break in the power source occurs. Detector 15 then ceases to change state for the entire duration while the power source is off, between times $t_B$ and $t_C$. At time $t_C$, as soon as the rectified AC voltage reaches the value $V_H$, detector 15 begins to change state again. In this way a succession of square-wave pulses I are obtained at the output of detector 15.

The diagram in FIG. 2c represents the signal $M_1$ obtained at the direct ($\overline{Q}$) output 22 of monostable flip-flop 20. The conduction period for monostable flip-flop 20 is chosen in such a way that it lies between one and two full cycles of the AC power source; in the embodiment being described, the conductive period is approximately 30 milliseconds. Thus, as long as there is no break in the AC power source, flip-flop 20 conducts, but it will stop conducting at time $t_F$, 30 milliseconds after the power source break, at time $t_B$. Any break in the power source which lasts less than 30 milliseconds is masked by monostable flip-flop 20. Flip-flop 20 conducts again at time $t_G$ almost immediately after the AC power is restored, in response to the trailing edge of the first pulse $I_1$ emitted by detector 15.

The diagram in FIG. 2d represents the signal $M_2$ obtained at the reverse (Q) output 23 of monostable flip-flop 21. The conductive period of flip-flop 21 is relatively long and at least equal to the time required for current to build up in input filter 7 of DC to DC converter 3. In a preferred embodiment, the conducting time of flip-flop 21 is approximately 1 second. It is clear that flip-flop 21 stops conducting after one second, if the AC power has been off for at least one second. Flip-flop 21 is triggered by the trailing edge of the first pulse emitted by detector 21 when the power supply is switched on or when the supply comes on again after a break.

In FIG. 2e is illustrated the waveform for the signal derived from the output of AND gate 24. Gate 24 responds to the signal from the reverse ($\overline{Q}$) output 23 of flip-flop 21 and to the signal derived from the direct (Q) output 22 of flip-flop 20.

A break in the power source and its restoration take place simultaneously at inputs $E_1$ and $E_2$ of the DC power supply and the current limiting controller.

When the AC power source comes on at time $t_A$, the trigger changes state and emits pulses I. In response to the trailing edge of the first of these pulses, monstable flip-flops 20 and 21 begin to conduct at time $t_H$. If there is a break in the AC source at time $t_B$, the first monostable 20 stops conducting at time $t_F$, about 30 milliseconds after the break time $t_B$. The second monostable 21 stops conducting at a considerably later time, $t_J$, second after $t_F$. At time $t_H$, the control or gate electrode of the first thyristor 18 goes from a low to a high voltage level causing the thyristor to fire so the branch formed by resistor 17 and thyristor 18 becomes conductive. The current drawn from the source at voltage $E_1$ by the power supply is thus limited by resistor 17. At time $t_H$, monostable flip-flop 21 is conductive so the output signal from AND gate 24 is at a low level, whereby thyristor 19 does not conduct. After $t_J$ seconds have elapsed after restoration of the A.C. power source, that is, one second after the AC power source is restored, monostable flip-flop 21 stops conducting and the output signal of AND gate 24 goes to a high level, causing the gate of thyristor 19 to be fired via lead 12. The branch formed by resistor 17 and thyristor 18 is then short-circuited and the output current from the power supply is no longer limited, although thyristor 18 is still conductive. If there is then a break in the AC supply at time $t_B$, threshold detector 15 does not change state at time $t_K$ and 30 milliseconds later, at time $t_F$, monostable flip-flop 20 stops conducting. Thyristor 18 stops conducting as does thyristor 19, which is actuated by the output of AND gate 24.

If the AC supply is restored at time $t_C$, detector 15 is again in a position to change state so flip-flops 20 and 21 begin to conduct again at time $t_G$. The gradual starting up procedure is then repeated as before.

The invention allows the objects mentioned above to be achieved; namely: limiting any excess current in the power supply following a break in the AC source, masking any transient breaks in the AC source, and providing a short response time for the converter when the AC source is restored.

While there has been described and illustrated one specific embodiment of the invention, it will be clear that variations in the details of the embodiments specifically illustrated and described may be made without departing from the true spirit and scope of the invention as defined in the appended claims.

What is claimed is:

1. In an apparatus for supplying full current during steady state operation and very short duration breaks and for limiting current during transient operation in a DC electrical apparatus including rectifying and/or filtering circuits, the limiting apparatus having input and output terminals connected between an AC source feeding the DC apparatus and the rectifying and/or filtering circuits, a controller for limiting the current during transient operation comprising a threshold detector responsive to the amplitude of the AC source, timing means responsive to an output of the threshold detector, a switching circuit for controlling current flow between the AC source and DC apparatus, said switching circuit having control input means connected to be responsive to an output of the timing means, the timing means and threshold detector including means for actuating the switching circuit to limit any excess current in the electrical apparatus at the moment when the AC source comes on and for maintaining the switching circuit in full conducting state for the very short duration breaks.

2. The apparatus of claim 1 wherein the switching circuit has two parallel branches, one of said branches including a resistor connected in series with a first thyristor and the other branch containing a second thyristor as the only substantial impedance between the input and output terminals, gates of said thyristors forming firing control inputs being responsive to different outputs of the timing means.

3. The apparatus of claim 2 wherein the threshold detector value is a Schmitt trigger having voltage hysteresis characteristics.

4. The apparatus of claim 3 wherein the timing means includes: a first monostable flip-flop having an input connected to the output of the Schmitt trigger and an output for controlling the gate of the first thyristor, a second monostable flip-flop having two inputs, one of the two inputs being connected to the output of the first monostable flip-flop and the other of the two inputs being connected to the output of the Schmitt trigger, an output of the second flip-flop controlling the gate of the second thyristor.

5. The apparatus of claim 4 wherein the conductive period of the first monostable flip-flop is between one and two cycles of the AC supply, the conductive period of the second monostable flip-flop is at least equal to the time required by the current to build up in an input filter of the DC apparatus.

6. The apparatus of claim 1 wherein the threshold detector value is a Schmitt trigger having voltage hysteresis characteristics.

7. A circuit for controlling the current supplied by a power source to a load so that full current is supplied during steady state operation and momentary changes in the source, but partial current is supplied during transient conditions, the momentary changes being such shorter than the transient conditions, comprising selectively energized series switch means connected between the power source and the load, means connected in circuit with the switch means for selectively causing the partial and full currents to be supplied by the power source to the load, means responsive to the amplitude of the source for activating the switch means so: no current is supplied by the source to the load in response to the source amplitude being less than a predetermined level, the partial current is supplied by the source to the load in response to the amplitude of the source being greater than the predetermined level for an interval equal approximately to the duration of the transient conditions, full current is supplied by the source to the load in response to the amplitude of the source being greater than the predetermined level for an interval at least equal to the interval required to reach steady state operation, and the switching means is maintained in the same state even though the momentary changes in the amplitude of the power source occur.

8. The circuit of claim 7 wherein the power source is an AC source of predetermined frequency, the activating means including means for enabling currents from the source to be supplied to the load for between one and two cycles of the AC source after the source amplitude drops below the predetermined level.

9. The circuit of claim 8 wherein the power source is an AC source of predetermined frequency, the activating means including means for preventing currents from the source to be supplied to the load for approximately one half cycle of the AC source after the source amplitude rises above the predetermined level.

10. The circuit of claim 9 wherein the activating means includes a threshold detector having amplitude hysteresis, said detector being responsive to the amplitude of the AC source.

11. The circuit of claim 10 wherein the activating means includes a pair of monostable multivibrators having timing intervals associated with intervals of the transient, momentary change and to achieve steady state operation, said multivibrators being responsive to an output signal of the threshold detector.

12. The circuit of claim 7 wherein the power source is an AC source of predetermined frequency, the activating means including a threshold detector, said detector being responsive to the amplitude of the AC source, said activating means including a pair of monostable multivibrators having timing intervals associated with intervals of the transient condition momentary change and to achieve steady state operation, said multivibrators being responsive to an output signal of the threshold detector.

13. The circuit of claim 7 wherein the power source is an AC source of predetermined frequency, the activating means including means for preventing currents from the source to be supplied to the load for approximately one half cycle of the AC source after the source amplitude rises above the predetermined level.

* * * * *